Aug. 2, 1949.                    J. MELPOLDER                    2,478,159
                              BREAD CUTTING MACHINE
Filed Feb. 12, 1946                                          4 Sheets-Sheet 1

INVENTOR.
John Melpolder
BY Victor J. Evans & Co.
ATTORNEYS

Aug. 2, 1949.  J. MELPOLDER  2,478,159
BREAD CUTTING MACHINE
Filed Feb. 12, 1946  4 Sheets-Sheet 3

INVENTOR.
John Melpolder
BY Victor J. Evans & Co.
ATTORNEYS

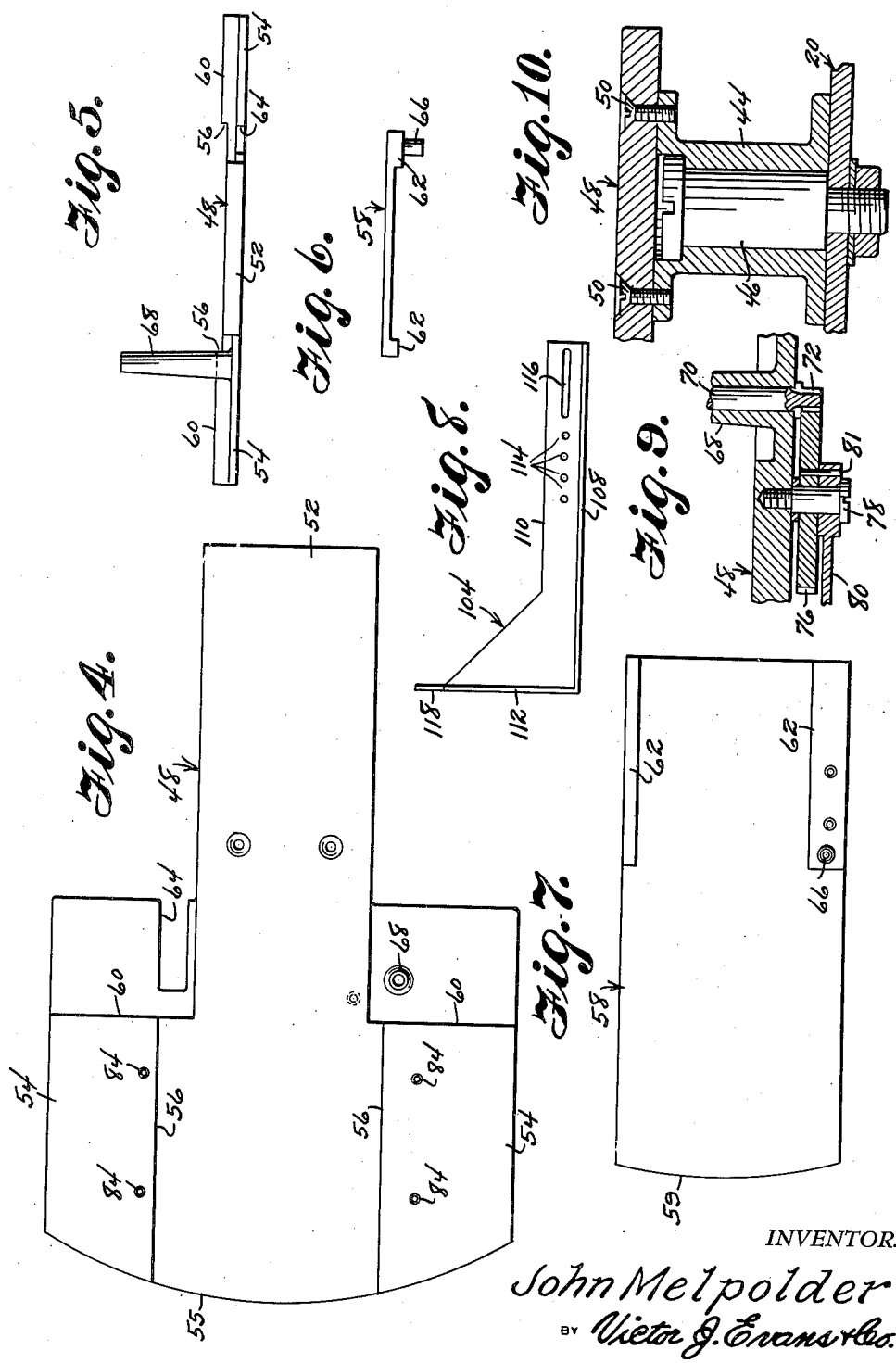

Patented Aug. 2, 1949

2,478,159

UNITED STATES PATENT OFFICE 2,478,159

BREAD CUTTING MACHINE

John Melpolder, Grand Rapids, Mich.

Application February 12, 1946, Serial No. 647,035

3 Claims. (Cl. 146—102)

This invention relates to an improved cutting or slicing machine and the primary object of the invention is to provide a machine that will slice or cut bread to any desired thickness.

Another object of the invention is to provide a device that is simple in operation, efficient and reliable in use and can be economically manufactured.

With the above and other objects in view the invention consists of the novel details of construction, arrangement and combination of parts more fully hereinafter described, claimed and illustrated in the accompanying drawings in which:

Figure 4 is a detailed plan view of the swinging support for the bread;

Figure 5 is an end view thereof;

Figure 6 is an end view of the sliding support for the bread;

Figure 7 is a bottom plan view thereof;

Figure 8 is an elevational view of the gauge for the bread;

Figure 9 is a sectional view on the line 9—9 of Figure 1 and

Figure 10 is a sectional view on the line 10—10 of Figure 1.

Figure 1:
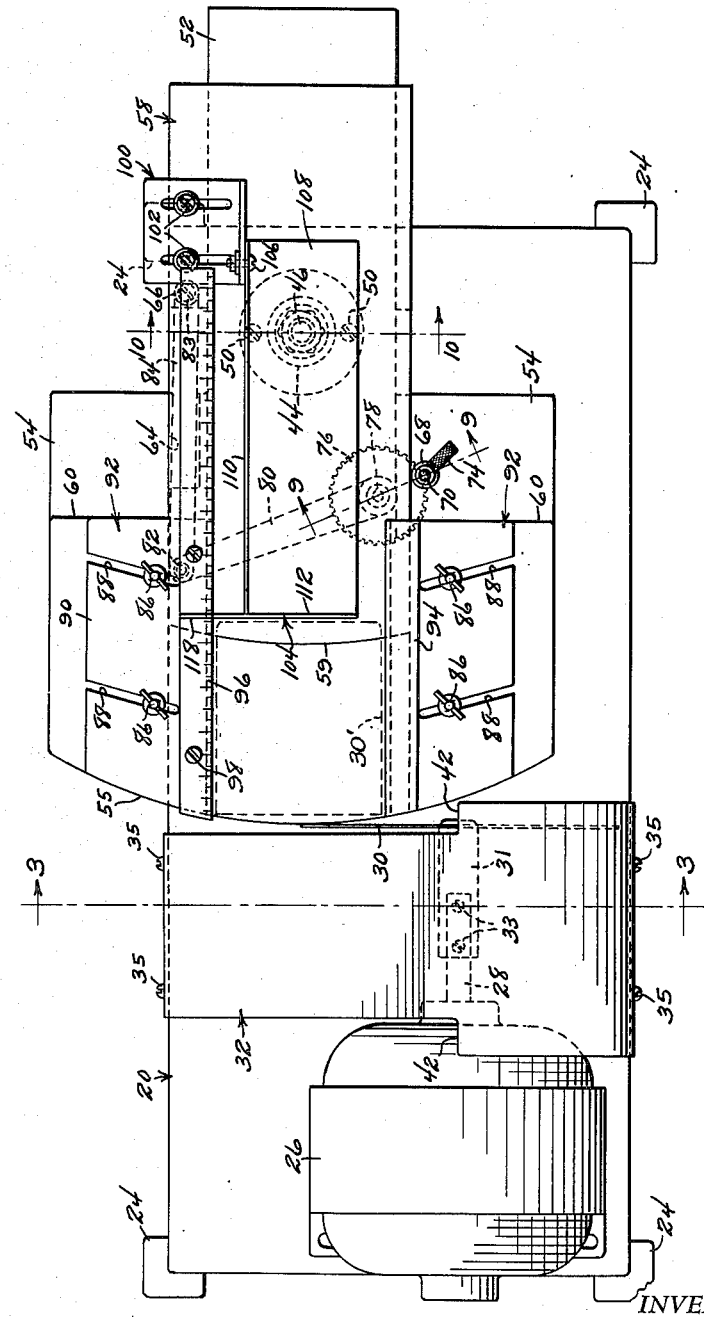
Figure 1 is a top plan view of an embodiment of the invention.
Figure 2:
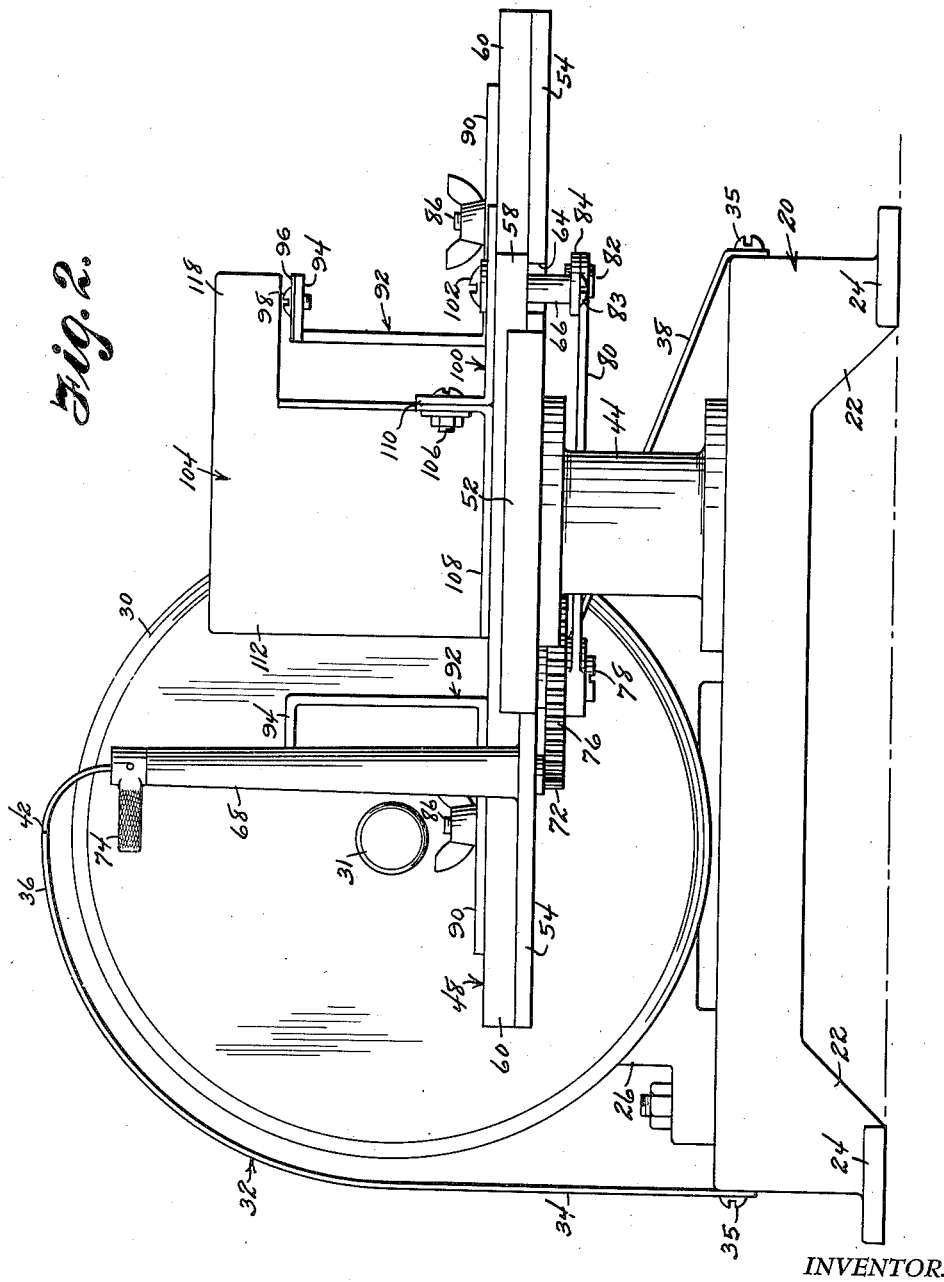
Figure 2 is an end view thereof.
Figure 3:
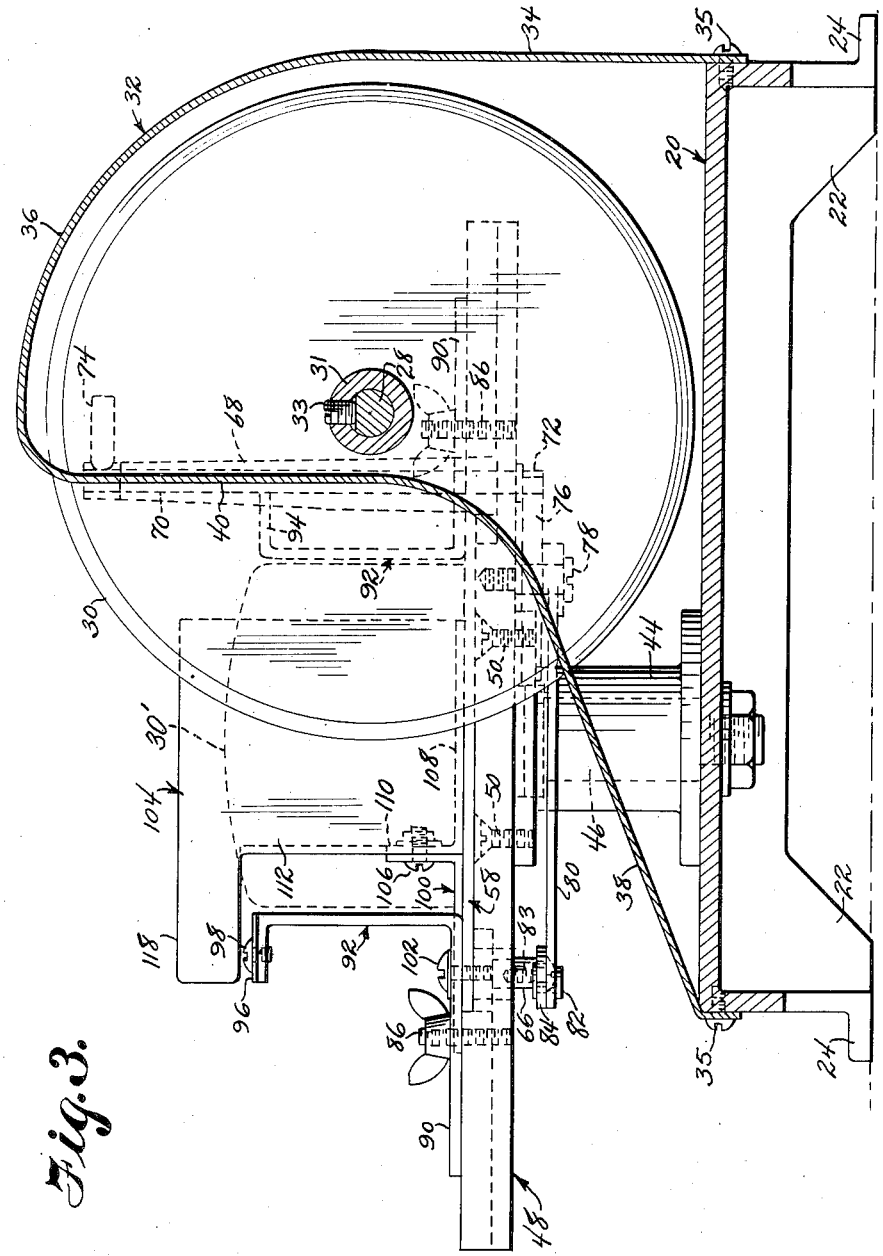
Figure 3 is a sectional view on the line 3—3 of Figure 1.

Referring more in detail to the drawings the numeral 20 designates the base of the slicing machine having the depending legs 22 at the four corners thereof with the feet 24 on the lower ends thereof.

An electric motor 26 is secured to the base 20 adjacent one end thereof and the drive shaft 28 of the motor 26 is provided at the end thereof with a circular or disc knife 30 having a sleeve 31 mounted on the shaft and retained thereon by screws 33.

Secured to the outer side edges of the base 20 adjacent to the motor 26 by fasteners 35 and covering a portion of the knife 30 is the guard 32 having the straight outer side 34 curved top 36 and the delivering chute 38 forms the other side of the guard.

The chute 38 has the straight portion 40 which is substantially parallel to the side 34 of the guard and the guard is provided with shoulders 42 at its meeting with the portion 40.

Adjacent the end of the base 20 opposite the motor 26 a pedestal 44 is rotatably mounted on the base by means of the bolt 46 and the rotary support 48 for the bread is secured to the pedestal by bolts 50.

The support 48 has the elongated center portion 52 and the wings 54 formed on the forward end of the support and the ends of the portion 52 and wings 54 are curved at 55 to coact with the knife 30 when the support is swung past the knife for cutting the bread.

The wings 54 are raised at 56 above the level of the portion 52 to form a trackway for the sliding support 58 and the wings at 60 are lowered below the level of the portion 52 to receive the guide rails 62 on the bottom of the support 58 adjacent the outer end thereof. One of the wings is provided with a slot 64 to receive the pivot 66 on one of the guide walls 62 and a tubular spindle 68 is mounted on the opposite wing 54 and the forward end of the support 58 is curved at 59 to conform with the curved end 55 end of the support 48.

A shaft 70 having a pinion 72 on the lower end thereof and a handle 74 on the upper end thereof is mounted in the spindle 68 and the pinion 72 meshes with the gear 76 rotatably mounted on the bearing pin 78 on the support 48, a lever 80 fixed to the gear 76 by a pin 81 is pivoted at 82 to a link 84 connected at the other end to the pivot 66 on the support 58 by the bolt 83. Thus rotation of the shaft 70 by means of the handle 74 will control the sliding movement of the support 58.

The wings 54 are apertured at 84 to receive bolts 86 which engage in elongated open ended slots 88 in the lower flange 90 of the bread clamping members 92 which are adjusted inwardly and outwardly to accommodate loaves of breads of various sizes. The members 92 have the upper flange 94 extending in the same direction and parallel to the lower flange and a gauge 96 is secured to one of the upper flanges 94 by fasteners 98.

A bracket 100 is adjustably secured to the support 58 on the upper surface thereof above the pivot 66 by fasteners 102 and a gauge 104 for the bread is adjustably connected to the bracket 100 by fasteners 106. The gauge 104 has the base portion 108 and the marginal flange 110 which is connected to the upright portion 112 formed on the forward end of the base portion 108. The flange is provided with apertures 114 and an elongated slot 116 whereby the gauge is adjustably connected to the bracket at 100 and a finger 118 on the upper end of the portion 112 extends outwardly therefrom to coact with the gauge 96 on the clamping members 92.

When it is desired to operate the slicing machine a loaf of bread 30' is placed on the portion 52 of the rotary support 48 so that an end portion of the bread loaf rests on the support 58 and the support 58 and against the gauge upright portion 112. The support 58 is moved forward to advance the bread toward the knife 30, by means of the handle 74, the clamping members 92 are moved inwardly not to bend the bread but to support the sides thereof as the bread is sliced. The support 48 is oscillated by the operator pushing or pulling on the tubular support 68. The bread is advanced, by turning the handle 74, for the desired thickness of the slice. After the motor is started, the tubular support 68 and thus the bread is swung against the knife from either side thereof. Each slice that is cut is gauged as to thickness by the handle 74 and the support 58 can be advanced until the last slice has been cut.

Meat rolls as well as bread can be cut by this machine and each slice can be determined before the cut is made. The bread is held firmly by the machine and since it does not have to be touched after it has been placed in the machine there is no chance of the operator being cut by the rotating knife.

It is believed that the operation and construction of the device will be apparent to those skilled in the art and it is to be understood that changes may be made in the details of construction, arrangement and combination of parts without departing from the spirit of the invention and the scope of the appended claims.

Having thus described the invention what is claimed as new and desired to be secured by Letters Patent is:

1. A slicing machine adapted to divide a solid substance and comprising a base, a substantially T-shaped support having an elongated central portion and a cross portion having transversely extending wing portions, means rotatably mounting the T-shaped support on said base for oscillation about an axis perpendicular to said base, the cross portion of said T-shaped support provided with a curved surface having its center of curvature at said perpendicular axis, an electric motor on said base, a circular disc knife having a peripheral cutting edge and driven by said electric motor, the axis of rotation of said circular disc knife being perpendicular to, and lying in a plane parallel to and spaced from, the axis about which the T-shaped support oscillates, said circular disc knife being substantially tangent to said curved surface of said T-shaped support at said peripheral cutting edge, a slidable support reciprocably mounted on said T-shaped support, said supports adapted to receive the solid substance to be sliced, guiding members on the wing portions of said T-shaped support for guiding the solid substance, means adjustably securing said guiding members to the wing portions of said T-shaped support for accommodating different widths of the solid substance to be sliced, a graduated measuring device on one of said guiding members, a gauge device on said slidable support, means adjustably securing said gauge device to said slidable support to accommodate different lengths of the solid substance to be sliced, an indicating tab extending from said gauge device and cooperating with said graduated measuring device to indicate the degree of adjustment between said T-shaped support and said slidable support and thereby the thickness of slice to be cut from the solid substance, a tubular spindle extending upwardly and perpendicularly from said T-shaped support, said tubular spindle being adapted to be manually actuated to oscillate said T-shaped support, a shaft rotatably mounted in said tubular spindle, said shaft having the ends thereof extending beyond both sides of said tubular spindle, a handle secured to one of said ends of said shaft for manually actuating the same, a pinion secured to the other end of said shaft, a gear rotatably mounted on said T-shaped support and meshing with said pinion, a lever secured to said gear, a boss depending from said slidable support, and a link pivotally secured to said lever and said boss whereby oscillation of said shaft causes the solid substance to be shifted relative to said circular disc knife to determine the thickness of slice to be cut.

2. The invention as in claim 1, wherein means is mounted on said oscillating support to gauge the thickness of the slice cut from the bread of said knife.

3. The invention as in claim 1, wherein a guard for the knife and a delivering chute for the bread after it has been sliced is mounted on said base.

JOHN MELPOLDER.

REFERENCES CITED

The following references are of record in the file of this patent:

UNITED STATES PATENTS

| Number | Name | Date |
| --- | --- | --- |
| 913,879 | Doty | Mar. 2, 1909 |
| 1,798,113 | Van Berkel | Mar. 24, 1931 |
| 2,119,762 | Wilson | June 7, 1938 |
| 2,305,117 | Litty | Dec. 15, 1942 |

FOREIGN PATENTS

| Number | Country | Date |
| --- | --- | --- |
| 15,122 | Great Britain | July 7, 1902 |